Oct. 26, 1965    L. E. AGEE    3,213,641
INSULATED LUNCH BOX
Filed March 6, 1963
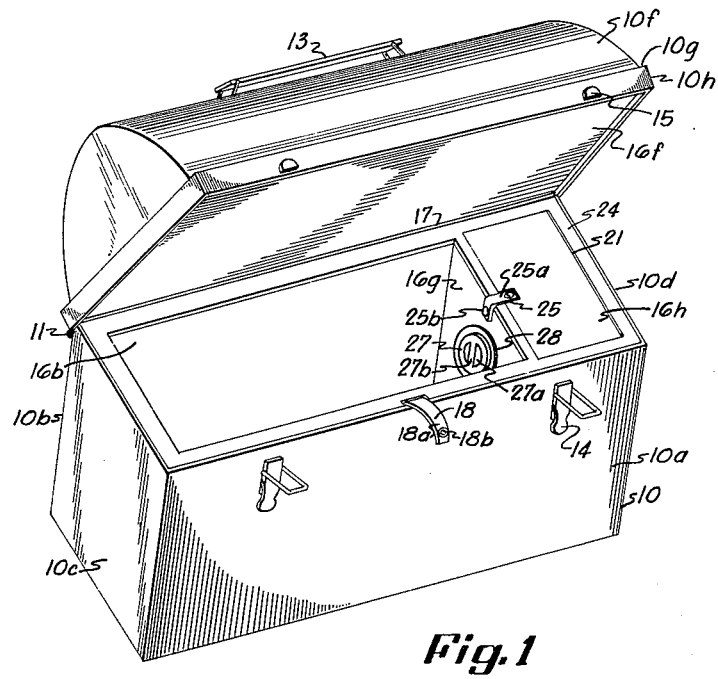
Fig. 1
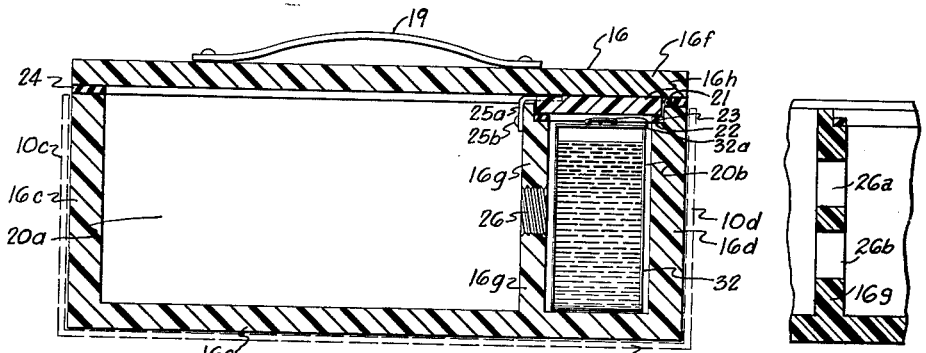
Fig. 2      Fig. 5
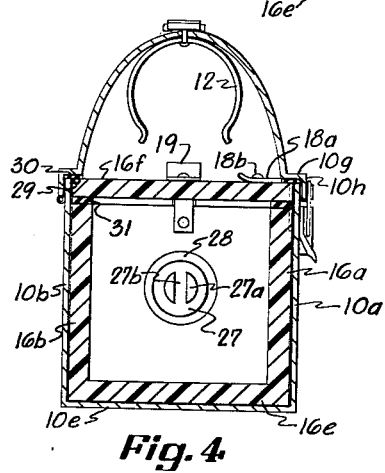
Fig. 3
Fig. 4
Louis E. Agee
INVENTOR.
BY John C. Stahl
ATTORNEY

United States Patent Office 3,213,641
Patented Oct. 26, 1965

3,213,641
INSULATED LUNCH BOX
Louis E. Agee, 6815 Biscayne Drive, San Antonio, Tex.
Filed Mar. 6, 1963, Ser. No. 263,183
3 Claims. (Cl. 62—457)

The present invention relates to an improved lunch box and more particularly to a lunch box wherein the foodstuffs placed therein may be maintained in either hot or cold condition, or both conditions simultaneously, as desired.

At the present time those individuals and school children carrying a lunch box in which is placed their meal often find the foodstuffs placed therein in a non-appetizing condition. For example, lettuce placed in a sandwich often loses its crispiness and taste if the temperature within the box rises appreciably. Other foods become non-palatable if the temperature changes to any great extent.

On the other hand, there are foods which preferably are to be maintained and eaten in a certain temperature range. A roast beef or roast pork sandwich preferably is to be eaten in a warmed or heated condition while fruits and vegetables packed in a lunch box, such as apples, pears, bananas, grapes, tomatoes, carrots and celery are more crisp or tasty if in a cooled condition.

An object of the present invention is the provision of an insulated lunch box wherein both hot and cold foodstuffs may simultaneously be preserved in a desired temperature range.

Another object is to provide an insulated container which may be utilized in the casing of a conventional lunch box.

A further object of the invention is the provision of a lunch box containing an insulated compartment, said lunch box being constructed in such a manner that the vacuum bottle attached in the upper portion of the box may be removed without affecting the temperature within the insulated compartment.

Still another object is to provide a lunch box that is easily cleaned and capable of being maintained in a sanitary condition.

Yet another object of the present invention is to provide a lunch box which is simple in construction, easy to use, inexpensive to manufacture, universal in its adaptability and alternatively, to an insulated container having such provisions which may be inserted in various sized conventional lunch boxes.

Other objects and features of the invention will become apparent to those skilled in the art as the disclosure is made in the following detailed description of preferred embodiments of the invention as illustrated in the accompanying sheet of drawing in which:

FIG. 1 illustrates a perspective view of the lunch box of the subject invention with the cover in open condition;

FIG. 2 shows an enlarged longitudinal sectional view of the insulated container with the lid in closed condition, said container being positioned in a lunch box casing, a portion of which is shown in dotted lines;

FIG. 3 is a fragmentary sectional view of the upper rear portion of the insulated container of FIG. 1;

FIG. 4 shows a sectional view of another insulated lunch box with the cover in closed condition; and FIG. 5 is a fragmentary, enlarged, vertical sectional view taken along the longitudinal axis of the container showing a modification of the partition.

Referring now to the drawings, wherein like reference characters designate like or corresponding parts throughout the several views, there is shown in FIG. 1 an essentially rectangular casing 10 consisting of sides 10a–10b, ends 10c–10d and bottom 10e. In the preferred embodiment of the invention the casing is approximately 11 inches in length, 5 inches in width and 5 inches in height and may be formed of plastic, light-weight metal or tin. A cover 10f of desired configuration hingedly connects as by means of a piano-type hinge 11 or the like to the outer, upper portion of side 10b. The cover 10f preferably is constructed of the same material as the casing and is generally in the form of an inverted U, the side and end portions of said cover include horizontally-extending portions 10g and vertical edge portions 10h depending therefrom which overlap the uppermost marginal portions of the casing 10, as illustrated in FIG. 3, and the modification of FIG. 4. The interior of said cover includes a clamp 12 (see FIG. 4) in the form of an inverted U whereby a vacuum bottle or the like may be secured whereas the outer surface of said cover includes a handle 13 secured thereto.

Cover 10f and the uppermost side and end portions (10a–10d) coact to form a closed, water-tight lunch box which when the cover is latched by means of the coacting latch parts 14 and 15, secured respectively to the side 10a and vertical portion 10h, may be carried or transported by means of handle 13.

As best seen in FIG. 2, an insulated container 16 inserts into the casing of FIG. 1 or, alternatively, into a conventional lunch box casing; said container includes sides 16a–16b, ends 16c–16d and bottom 16e. A lid 16f (also see FIG. 3) connects by means of a piano-type hinge 17 or the like to the upper portion of side 16b. A fastener 18, preferably a flexible strap 18a which includes a female member 18b, attaches by one end to side 16a; said female member snaps over the protruding male member (not shown) positioned on the upper surface of lid 16f to maintain the insulated container in closed condition. A handle 19 or the like is affixed to the upper surface of lid 16f providing means to more conveniently raise said lid or to remove the container from the casing.

Container 16 is divided into compartments 20a–20b by means of transverse partition 16g, additional compartments may likewise be provided by means of additional transverse and/or longitudinal partitions, as desired. The compartment 20b is additionally insulated as by means of a lid 16h which connects by hinge 21 to the upper portion of end 16d, said lid inserts into a recess 22 formed in the uppermost portion of partition 16g, the portions of sides 16a–16b which comprise compartment 20b and the end 16d; the marginal portions of the lower surface of lid 16h bear against a gasket 23 which is mounted in said recess 22. Gasket 24 or other sealing means is mounted, in a conventional manner, on the top surface of the sides, ends and transverse partition, respectively, of said container to effectively seal compartments 20a–20b when the lid 16f is closed and secured in the manner heretofore described.

To maintain lid 16h in closed condition a fastener 25 or other suitable fastening means secures the lid 16h to partition 16g. In a preferred embodiment of the invention, a flexible strap 25a contains a female member 25b, one end of said strap is affixed to the upper surface of lid 16h in a conventional manner; said strap 25a passes over the gasket 24 mounted on partition 16g and the female member snaps over the protruding male member on the innermost side of partition 16g thereby securing said lid to said partition. The flexible strap 25a may also be used to conveniently raise lid 16h.

When the cover 10f is closed the horizontally-extending portions 10g on the sides and ends of the cover bear against the marginal portions of the upper surface of cover 16f to additionally seal the container, as shown in FIG. 3 and in essentially the same manner as that illustrated and to be described in connection with the modification of FIG. 4.

Referring now to FIGS. 1 and 2 of the drawings, the partition 16g includes an aperture 26 into which inserts a close-fitting, insulated plug 27. In FIG. 5, a plurality of apertures 26a–26b are provided in the partition 16g. It is understood that corresponding sized plugs are to be utilized in the apertures 26a, 26b; also, the apertures 26a, 26b may be threaded as shown in FIG. 2 to accommodate the corresponding sized male threaded member. A washer 28 or the like may also be used with said plug. The plugs may be constructed of plastic, metal, soft rubber or composition material and preferably include a recessed portion 27a in one end thereof with a bar 27b transversing said recessed portion to aid in grasping and removing said plug.

There is shown in FIG. 4 a modification of the invention wherein the uppermost side and end portions of the insulated container are substantially below the edges of the casing. In this embodiment the lid 16f connects to hinge 29 which is affixed to the inner, uppermost portion of side 10b of the casing in such manner that the upper surface of lid 16f is flush with the top surface of the sides and ends of the casing. The bottom surface of horizontally-extending portion 10g of the cover further includes a rectangular gasket 30 which, when the cover is closed, bears against the edge of the side and end portions of the casing and the marginal portions of lid 16f, respectively, to additionally seal the container. A gasket 31 or the like may also be mounted on the top surfaces of the sides, ends and transverse partition, respectively.

It is to be understood that the invention is applicable to containers of various descriptions whose walls may have insulating materials embodied therein or air spaces between plural, thick walls. If desired, the walls may be molded of plastic or composition materials having good insulating properties.

When the lid 16f is secured in the manner heretofore described, the compartments 20a–20b are effectively sealed and the user may open the cover to remove the vacuum bottle, for example, without disturbing the contents in either of said compartments or appreciably affecting the temperature therein.

When the plug 27 is secured in aperture 26 and the lid 16h is secured as heretofore described, a hot sandwich or the like may be placed in compartment 20b and the temperature substantially maintained therein until such time as the contents are ready for consumption.

With the plug 27 in position, Dry Ice or a canned refrigerant such as "Dri-Cube" manufactured by Boyle-Midway, Inc., or Jerywil's "Iceberger" manufactured by Jobie Manufacturing Company, Inc., may be placed in compartment 20a along with foodstuffs and both hot and cold foodstuffs may simultaneously be preserved. Each of the canned refrigerants heretofore mentioned is of the type that is placed in the freezing compartment of a refrigerator or deep freeze unit until such time as the refrigerant is frozen solid at which time said refrigerant is ready for use.

In the event that only foodstuffs requiring a cool or cold temperature are to be placed in the lunch box of the subject invention, the plug 27 may be removed from the aperture 26, as illustrated in FIG. 2, and a sealed container 32, including a refrigerant of the type heretofore mentioned, is inserted in compartment 20b whereby compartment 20a is effectively refrigerated through aperture 26. Preferably, a ring 32a or the like is attached to the top surface of container 32 for convenience in handling.

The construction of container 16, heretofore described in detail, is such that said container may be inserted in any conventional lunch box casing. Furthermore, such construction has proven especially practical when used to contain foodstuffs which are to be maintained in a cooled condition only in that the foodstuffs may be prepared, placed in said container and refrigerated in said container in a refrigerator or the like until such time as the user is ready to depart. At such time the container 32 of frozen refrigerant is placed in compartment 20b, the lids 16h and 16f are closed and secured and said insulated container inserted within the casing of a conventional lunch box or within the casing of FIG. 1 of the subject invention.

It should be understood, of course, that the foregoing disclosure relates to only preferred embodiments of the invention and that numerous modifications or alterations may be made therein without departing from the spirit and scope of the invention as set forth in the appended claims.

Having thus described the invention, what is claimed is:

1. An insulated lunch box comprising a casing consisting of sides, ends, bottom and a cover connecting to one side of said casing, an insulated container within said casing, said container consisting of sides, ends, bottom and a lid connecting to one side of said container, a transverse partition separating said container into first and second compartments, at least one aperture in said partition, a canned refrigerant placed in said second compartment whereby said first compartment is effectively cooled through said aperture.

2. An insulated lunch box comprising a casing, said casing consisting of sides, ends, bottom and a cover hingedly connecting to one side of said casing, an insulated container positioned within said casing, said container consisting of sides, ends, bottom and a first lid hingedly connecting to one side of said container, a transverse insulated partition separating said container into first and second compartments, at least one aperture in said partition, a second lid hingedly connecting to one end of said second compartment, fastening means securing said first lid to said container, fastening means securing said second lid to said partition, and a container of refrigerant placed in said second compartment whereby said first compartment is effectively cooled through said aperture in said partition.

3. An insulated container positioned in the casing of a conventional lunch box, said container consisting of sides, ends, bottom and a first lid connecting to one side of said container, a transverse partition separating said container into first and second compartments, a plurality of apertures in said partition, a second lid connecting to one end of said second compartment, means securing said first lid to said container, means securing said second lid to said partition, and a container of refrigerant placed in said second compartment whereby said first compartment is cooled through said apertures in said partition.

References Cited by the Examiner

UNITED STATES PATENTS

| | | | |
|---|---|---|---|
| 607,294 | 7/98 | Swift | 206—4 |
| 1,511,306 | 10/24 | Slate | 62—371 |
| 1,850,202 | 3/32 | Gerhardt | 206—4 |
| 2,385,866 | 10/45 | Kuehner | 62—372 |
| 2,403,858 | 7/46 | Groom | 62—371 |
| 2,436,097 | 2/48 | Clarloe | 206—4 |
| 2,504,911 | 4/50 | Whitecar | 62—457 |
| 2,514,651 | 7/50 | Kornfeld | 229—14 |
| 2,577,959 | 12/51 | Gattuso | 220—15 |
| 2,584,435 | 2/52 | Doerr | 206—4 |
| 2,731,996 | 1/56 | Hayes | 150—5 |
| 2,761,552 | 9/56 | Levine | 206—4 |
| 3,026,995 | 3/62 | Slaughter | 206—4 |
| 3,054,502 | 9/62 | Morris | 206—4 |

LOUIS G. MANCENE, *Primary Examiner.*

THERON E. CONDON, *Examiner.*